(12) United States Patent
Brink et al.

(10) Patent No.: US 10,055,326 B2
(45) Date of Patent: Aug. 21, 2018

(54) METHOD AND SYSTEM FOR MONITORING THE STATE OF HEALTH OF AN ELECTRONIC DATA CARRIER

(71) Applicant: NXP B.V., Eindhoven (NL)

(72) Inventors: Klaas Brink, Waalre (NL); Manvi Agarwal, Eindhoven (NL); Ghiath Al-kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 174 days.

(21) Appl. No.: 14/027,146

(22) Filed: Sep. 13, 2013

(65) Prior Publication Data

US 2014/0082429 A1    Mar. 20, 2014

(30) Foreign Application Priority Data

Sep. 17, 2012  (EP) .................................... 12184723

(51) Int. Cl.
  *G06F 11/34* (2006.01)
  *G06F 1/32* (2006.01)
  (Continued)

(52) U.S. Cl.
  CPC ........ *G06F 11/3409* (2013.01); *G06K 7/0008* (2013.01); *G06K 7/0095* (2013.01); *G06K 19/0723* (2013.01)

(58) Field of Classification Search
  CPC ......... G06K 19/00749; G06K 19/0723; G06K 7/0008; G06K 7/0095; G06K 19/0707; G06K 19/0712; G06K 19/07777; G06K 19/0701; H04B 17/318; H04B 5/0062; H04B 5/02; H04B 5/006; B60C 23/0413; F24F 2011/0075; H02J 17/00; H02J 5/005; G06F 11/3409; G06F 1/3203;
  (Continued)

(56) References Cited

U.S. PATENT DOCUMENTS 5,657,332 A * 8/1997 Auclair ................. G11C 16/10
  365/184
6,072,282 A * 6/2000 Adamson ........... H05B 41/2827
  315/247

(Continued)

FOREIGN PATENT DOCUMENTS

WO  2006/031824 A2  3/2006
WO  2007/099339 A1  9/2007

OTHER PUBLICATIONS

Extended European Search Report for Patent Appln. No. 12184723.0 (Jun. 5, 2013).

(Continued)

*Primary Examiner* — Phung M Chung

(57) ABSTRACT

In an embodiment, a method for monitoring the state of health of an electronic data carrier involves using a reader device to determine the state of health of the electronic data carrier by reading a parameter value indicative of a state of health from the electronic data carrier. In an embodiment, a system for monitoring a state of health of an electronic data carrier comprising a reader device operable to read data from the electronic data carrier. The reader device is arranged to determine the state of health of the electronic data carrier by reading a parameter value indicative of the state of health from the electronic data carrier.

10 Claims, 4 Drawing Sheets

REQUEST A PARAMETER VALUE INDICATIVE OF THE STATE OF HEALTH FROM THE ELECTRONIC DATA CARRIER USING A READER DEVICE, WHERE THE PARAMETER VALUE IS INDICATIVE OF A CHANGE IN AN AMOUNT OF POWER REQUIRED TO READ DATA FROM THE ELECTRONIC DATA CARRIER, WHERE THE AMOUNT OF POWER REQUIRED TO READ DATA FROM THE ELECTRONIC DATA CARRIER IS DERIVED FROM A PERFORMANCE OF A POWER RECTIFIER EMBEDDED IN SAID ELECTRONIC DATA CARRIER, AND WHERE THE PERFORMANCE OF THE POWER RECTIFIER COMPRISES A POWER RECTIFIER EFFICIENCY OF THE POWER RECTIFIER — 802

DETERMINE THE STATE OF HEALTH OF THE ELECTRONIC DATA CARRIER BASED ON THE PARAMETER VALUE — 804

(51) Int. Cl.
*H04B 1/16* (2006.01)
*G06K 7/00* (2006.01)
*G06K 19/07* (2006.01)

(58) Field of Classification Search
CPC ... G06F 1/324; G06F 19/323; G08B 13/2437; G08B 29/181; H04W 52/029; Y02B 60/1217; Y02B 60/50; G05F 1/56; H02M 2001/4283
USPC ..... 340/333, 540, 572.1, 635, 636.1, 636.15
See application file for complete search history.

(56) References Cited

U.S. PATENT DOCUMENTS

| | | | | |
|---|---|---|---|---|
| 6,134,130 | A * | 10/2000 | Connell | G06K 19/0701 363/70 |
| 6,181,152 | B1 | 1/2001 | Enguent | |
| 6,734,797 | B2 * | 5/2004 | Shanks | G06K 7/0008 340/572.1 |
| 7,181,651 | B2 | 2/2007 | Gross et al. | |
| 7,225,992 | B2 * | 6/2007 | Forster | G06K 7/0008 235/382 |
| 7,271,608 | B1 | 9/2007 | Vermeire et al. | |
| 7,306,162 | B2 * | 12/2007 | Forster | G06K 7/0008 235/382 |
| 7,516,057 | B2 * | 4/2009 | Bridgelall | G06K 7/0008 340/572.1 |
| 7,616,021 | B2 | 11/2009 | Papageorgiou et al. | |
| 7,619,908 | B2 | 11/2009 | Hofmeister et al. | |
| 7,733,218 | B2 * | 6/2010 | Drago | G06K 19/0716 340/10.33 |
| 7,760,074 | B2 | 7/2010 | Cato et al. | |
| 7,868,482 | B2 * | 1/2011 | Greene | H02J 1/10 307/82 |
| 7,904,195 | B2 | 3/2011 | Chao et al. | |
| 8,955,757 | B2 * | 2/2015 | Jung | H02J 17/00 235/492 |
| 9,000,616 | B2 * | 4/2015 | Greene | H02J 1/10 307/82 |
| 2002/0097144 | A1 * | 7/2002 | Collins | G06F 1/3203 340/333 |
| 2005/0030201 | A1 * | 2/2005 | Bridgelall | G06K 19/0723 340/870.11 |
| 2005/0098630 | A1 | 5/2005 | Nakazawa | |
| 2006/0049249 | A1 | 3/2006 | Sullivan | |
| 2007/0018831 | A1 | 1/2007 | Shanton | |
| 2007/0091677 | A1 * | 4/2007 | Lasser | G06F 11/1068 365/185.09 |
| 2007/0095915 | A1 | 5/2007 | Crooks | |
| 2007/0247286 | A1 * | 10/2007 | Drago | G06K 19/0716 340/10.4 |
| 2008/0001577 | A1 * | 1/2008 | Sather | B60C 23/0411 320/162 |
| 2008/0106410 | A1 | 5/2008 | Jesionowski | |
| 2008/0111688 | A1 * | 5/2008 | Nikitin | G06K 7/0008 340/572.1 |
| 2008/0141072 | A1 | 6/2008 | Kalgren et al. | |
| 2009/0219139 | A1 | 9/2009 | Slesinski | |
| 2010/0019907 | A1 * | 1/2010 | Shanks | G06K 7/0008 340/572.5 |
| 2010/0029202 | A1 * | 2/2010 | Jolivet | G06K 7/0008 455/41.1 |
| 2010/0157766 | A1 | 6/2010 | Gregg et al. | |
| 2010/0191503 | A1 | 7/2010 | Pecht et al. | |
| 2010/0228423 | A1 | 9/2010 | Howell et al. | |
| 2010/0306577 | A1 | 12/2010 | Dreifus et al. | |
| 2012/0161522 | A1 * | 6/2012 | Nam | H02J 9/005 307/64 |
| 2013/0033118 | A1 * | 2/2013 | Karalis | H02J 17/00 307/104 |
| 2013/0343106 | A1 * | 12/2013 | Perreault | H03H 7/38 363/67 |
| 2013/0343107 | A1 * | 12/2013 | Perreault | H03H 7/38 363/67 |
| 2014/0015335 | A1 * | 1/2014 | Lee | H01F 38/14 307/104 |
| 2015/0244176 | A1 * | 8/2015 | Van Den Brink | H02J 5/005 307/104 |

OTHER PUBLICATIONS

"Smart card", Wikipedia, 12 pgs., retrieved from Internet Archive Sep. 13, 2017 at: https://web.archive.org/web/20111104051514/http://en.wikipedia.org/wiki/Smart_card (Nov. 4, 2011).

Naullet, H. "Challenges & Trends for Electronic Passports—Developing Innovative Solutions for Security, Reliability, Physical Appearance and Cost-effectiveness", retrieved from internet archive Sep. 12, 2017 at: http://web.archive.org/web/*/http://www.ida.gov.sg/doc/technology/technology_level3/Herve_Naullet_ASK_eID_-_Aesthetic_-_Reliability.pdf (Jul. 5, 2007).

"White Paper on the Durability of Smartcards for Government eID", Eurosmart, 12 pgs., retrieved from the internet Sep. 12, 2017 at: http://www.eurosmart.com/images/doc/WorkingGroups/e-ID/Papers/eurosmart_smartcard_durability_wpfinal.pdf (Jul. 2008).

Vichare, N. M. et al. "Prognostics and Health Management of Electronics", IEEE Transactions on Components and Packaging Technologies, vol. 29, No. 1, pp. 222-229 (Mar. 2006).

Leveson, N. G. "Engineering a Safer World—Safety Thinking Applied to Safety", MIT, 463 pgs., retrieved from internet archive Sep. 13, 2017 at: http://web.archive.org/web/20111110133443/http://sunnyday.mit.edu/safer-world/safer-world.pdf (Nov. 10, 2011).

Sundstrom, T. et al. "Prognostics of Electronic Systems through Power Supply Current Trends", retrieved from the internet Sep. 13, 2017 at: https://www.fs.isy.liu.se/Publications/Articles/PHM_08_TS_BM_MKr_Mkl_et_al.pdf ,7 pgs. (2008).

Brown, D. W. et al. "Electronic Prognostics—A Case Study Using Global Positioning System (GPS)", IEEE Autotestcon, 7 pgs. (Sep. 2005).

Nanduri, S. et al. "Circuit as a Sensor, a Practical approach toward Embedded Electronic Prognostics", IEEE Autotestcon, pp. 632-638 (2007).

Celaya, J. R. et al. "Accelerated Aging System for Prognostics of Power Semiconductor Devices", IEEE Autotestcon, pp. 1-6 (2010).

Roy, S. et al. "RFID: From Supply Chains to Sensor Nets", Proceedings of the IEEE, vol. 98, No. 9, pp. 1583-1592 (2010).

"Welcome to GNU Radio!", GNU Radio, 2 pgs., retrieved from the internet archive Sep. 13, 2017 at: http://web.archive.org/web/20111223061440/http://gnuradio.org/redmine/projects/gnuradio/wiki (Dec. 23, 2011).

Buettner, M. et al. "A Software Radio-Based UHF RFID Reader for PHY/MAC Experimentation", IEEE International Conference on RFID, pp. 134-141 (2011).

"Scilab", Scilab, 1 pg., retrieved from the internet Sep. 13, 2017 at: https://web.archive.org/web/20110924120609/http://www.scilab.org/ (Sep. 24, 2011).

"UHF Gen 2 System Overview", Texas Instruments, 47 pgs., retrieved from the internet Sep. 13, 2017 at: http://read.pudn.com/downloads102/ebook/418037/TI_rfid-tutorial2.pdf (Sep. 2005).

"Class-1 Generation 2 UHF RFID", EPC Global, 24 pgs., retrieved from the internet Sep. 13, 2017 at: http://www.entmerch.org/programsinitiatives/packaging-labeling-and-edi/class-1-gen-2.pdf (2005).

Griffin, J. "The Fundamentals of Backscatter Radio and RFID Systems—Part I", Disney Research, 89 pgs. retrieved from the internet Sep. 13, 2017 at: https://wireless.vt.edu/symposiumarchives/symposium/2009/2009Tutorials/Fundamentals%20of%20Backscatter_Part%201_Griffin.pdf (2009).

Griffin, J. "The Fundamentals of Backscatter Radio and RFID Systems—Part II", Disney Research, 80 pgs. retrieved from the internet Sep. 13, 2017 at: https://wireless.vt.edu/

(56) References Cited

OTHER PUBLICATIONS symposiumarchives/symposium/2009/2009Tutorials/Fundamentals%20of%20Backscatter_Part%202_Griffin.pdf (2009).

Zick, K. M. et al. "On-Line Sensing for Healthier FPGA Systems", 10 pgs., Proceedings of the 18$^{th}$ Annual ACM/SIGDA International Symposium on Field Programmable Gate Arrays, retrieved from the internet Sep. 13, 2017 at: http://citeseerx.ist.psu.edu/viewdoc/download?doi=10.1.1.172.1893&rep=rep1&type=pdf(Feb. 2010).

Blossom, E. "Exploring GNU Radio", GNU Radio, 10 pgs., retrieved from internet archive Sep. 13, 2017 at: http://web.archive.org/web/20051231081600/http://www.gnu.org/software/gnuradio/doc/exploring-gnuradio.html(Dec. 31, 2005).

"The USRP2", Ettus Research, 2 pgs., retrieved from internet archive Sep. 13, 2017 at: http://web.archive.org/web/20111228115449/http://www.ettus.com/downloads/ettus_ds_usrp2_v5.pdf (Dec. 28, 2011).

"TX and RX Daughterboards for the USRP Software Radio System", Ettus Research, 2 pgs., retrieved from the internet archive Sep. 13, 2017 at: http://web.archive.org/web/20111215131647/http://www.ettus.com/downloads/ettus_daughterboards.pdf (Dec. 15, 2011).

"WISP: Wireless Identification and Sensing Platform", Intel Labs, 4 pgs., retrieved from the internet archive Sep. 13, 2017 at: http://web.archive.org/web/20110723155705/http://www.seattle.intel-research.net/wisp/ (Aug. 20, 2011).

"Gen 2 RFID Tools", GNC Radio, 2 pgs., retrieved from the internet Sep. 13, 2017 at: https://web.archive.org/web/20120120204556/https://www.cgran.org/wiki/Gen2 (Jan. 20, 2012).

Buettner, M. et al. "A Gen 2 RFID Monitor Based on the USRP", ACM SIGCOMM Computer Communication Review, vol. 40, No. 3, 6 pgs., retrieved from the internet Sep. 14, 2017 at: https://pdfs.semanticscholar.org/584c/cbfb0a16841d51a04078465d1faa64d9c7e5.pdf (Jul. 2010).

"Machine Readable Travel Documents—Part 3—Machine Readable Official Travel Documents, vol. 1 MRtds with Machine Readable Data Stored in Optical Character Recognition Format", International Civil Aviation Organization, 122 pgs. (2008).

* cited by examiner

METHOD AND SYSTEM FOR MONITORING THE STATE OF HEALTH OF AN ELECTRONIC DATA CARRIER

CROSS-REFERENCE TO RELATED APPLICATIONS

This application claims the priority under 35 U.S.C. §119 of European patent application no. 12184723.0, filed on Sep. 17, 2012, the contents of which are incorporated by reference herein.

FIELD OF THE INVENTION

The invention relates to a method for monitoring the state of health of an electronic data carrier. The invention further relates to a system for monitoring the state of health of an electronic data carrier.

BACKGROUND OF THE INVENTION

Electronic data carriers for identification systems are typically embedded in contact-bound smart cards, contactless smart cards, e-passports and Radio Frequency Identification (RFID) tags.

A smart card, chip card, or Integrated Circuit Card (ICC), is any pocket-sized card with embedded integrated circuits. A smart card typically contains memory components and microprocessor components. Smart cards can perform identification, authentication, data storage and application processing functions. The benefits of smart cards are directly related to the volume of information and applications that are programmed for use on a card. A single contact-bound or contactless smart card can be programmed with multiple banking credentials, medical entitlement, driver's license/public transport entitlement, loyalty programs and club memberships, for example. Multi-factor and proximity authentication is typically embedded into smart cards to increase the security of all services on the card. For example, a smart card can be programmed to only allow a contactless transaction if it is also within range of another device like a uniquely paired mobile phone. This can significantly increase the security of the smart card.

Governments gain a significant enhancement to the provision of publicly funded services through the increased security offered by smart cards. These savings are passed onto society through a reduction in the necessary funding or enhanced public services. Individuals gain increased security and convenience when using smart cards designed for interoperability between services. For example, consumers only need to replace one card if their wallet is lost or stolen. Additionally, the data storage available on a card could contain medical information that is critical in an emergency should the card holder allow access to this.

Electronic passports (e-passports) typically contain an electronic data carrier comprising a chip which carries personal data of the passport holder and which can be read-out by reader devices at airports, checkpoints etc. What makes e-passports "electronic" is the small RFID device embedded in the passport, which consists of a small data carrier chip and an antenna that allows passport information to be transmitted to reader devices via radio signals. Electronic passports contain the same information as non-electronic passports—name, date of birth, sex, place of birth, nationality etc.—but they also typically include biometric information like fingerprints, facial characteristics, DNA, and iris characteristics. Digital signature technology verifies the authenticity of the data stored on the chip.

RFID tags are typically attached to objects for the purposes of automatic identification and tracking RFID refers to the use of RF fields to transfer data from and to the tags. Some tags require no battery and are powered by the electromagnetic fields used to read them (passive tags). Others use a local power source and emit radio waves (electromagnetic radiation at radio frequencies) (active tags). The tags typically contain electronically stored information which can be read from up to several meters away. Unlike bar codes, the tags do not need to be within line of sight of a reader device and may also be embedded in the tracked object.

RFID tags are used in many industries. An RFID tag attached to an automobile during production can be used to track its progress through the assembly line, for example. Pharmaceuticals can be tracked through warehouses. Livestock and pets may have tags injected, allowing positive identification of the animal. RFID identity cards can give employees access to locked areas of a building, and RFID transponders mounted in automobiles can be used to bill motorists for access to toll roads or parking.

While the use of smart cards and tags in everyday life increases, for example for travelling, making payments, identification, authorization etc., there is an increased dependence on the reliable functioning of these cards and tags. Their widespread application demands them to be durable to avoid unwanted inconveniences to their users. However, the durability of such cards and tags comes into question because of the following reasons:

- They are subjected to varied stressful conditions like humidity, freezing temperatures, high temperatures, shock, vibration (e.g. in washing machines), bending (mechanical strain) etc.
- The electronic components used in these cards belong to smaller technology nodes, such as 65 nm and smaller, which are more likely to suffer from defects, for example from Time Dependent Dielectrical Breakdown (TDDB), Hot Carrier Injection (HCI), electro migration, increased leakage current, etc.
- Applications such as e-passports have a lifetime of around ten years and typically a smart card is expected to have a lifetime of around two to three years.

It is expected that a lack of adequate solutions for assessing the state of health of electronic data carriers of the kind set forth will create significant inconveniences for users. For example, a failing smart card is highly inconvenient for a user in a society that increasingly relies on the use of smart electronics for automated identification, authorization and payment. Assessing the state of health of the electronic data carriers may aid in preventing failure of said electronic data carriers.

SUMMARY OF THE INVENTION

It is an object of the invention to provide an adequate solution for determining the state of health of electronic data carriers of the kind set forth, thereby improving the reliability of said electronic data carriers. This object is achieved by a method for monitoring the state of health of an electronic data carrier as defined in claim 1. This object is also achieved by a system for monitoring the state of health of an electronic data carrier as defined in claim 13.

According to an aspect of the invention, a method for monitoring the state of health of an electronic data carrier is conceived, wherein a reader device operable to read data from said electronic data carrier determines the state of health of the electronic data carrier by reading a parameter value indicative of said state of health from the electronic data carrier.

According to an exemplary embodiment of the invention, the parameter value is indicative of a change in the amount of power required to read data from the electronic data carrier.

According to a further exemplary embodiment of the invention, the amount of power required to read data from the electronic data carrier is derived from the performance of a power rectifier embedded in said electronic data carrier.

According to a further exemplary embodiment of the invention, the performance of said power rectifier is determined by monitoring the voltage ripple of the power rectifier.

According to a further exemplary embodiment of the invention, the performance of said power rectifier is determined by repeatedly comparing the power received at an input of the power rectifier with the power delivered at an output of the power rectifier.

According to a further exemplary embodiment of the invention, the performance of said power rectifier is determined by monitoring the operation of a shunt regulator embedded in the electronic data carrier.

According to a further exemplary embodiment of the invention, the parameter value is indicative of a change of the resonant frequency of the electronic data carrier.

According to a further exemplary embodiment of the invention, the parameter value is indicative of a change of the Q-factor of an antenna embedded in the electronic data carrier.

According to a further exemplary embodiment of the invention, the parameter value is indicative of a change of the duty factor of an ASK load modulator embedded in the electronic data carrier.

According to a further exemplary embodiment of the invention, the parameter value is indicative of a change of the response time of the electronic data carrier.

According to a further exemplary embodiment of the invention, the parameter value is indicative of an error rate in the communication between the reader device and the electronic data carrier.

According to a further exemplary embodiment of the invention, the reader device compares said parameter value with further parameter values, said further parameter values being indicative of the state of health of further electronic data carriers.

According to a further exemplary embodiment of the invention, the present state of health of the electronic data carrier is determined by a dedicated interaction between the reader device and the electronic data carrier.

According to a further aspect of the invention, a system for monitoring the state of health of an electronic data carrier is provided, the system comprising a reader device operable to read data from said electronic data carrier, wherein said reader device is arranged to determine the state of health of the electronic data carrier by reading a parameter value indicative of said state of health from the electronic data carrier.

According to a further exemplary embodiment of the invention, the electronic data carrier is embedded in one of the group consisting of: a contact-bound smart card, a contactless smart card, an electronic passport, an RFID tag.

BRIEF DESCRIPTION OF THE DRAWINGS

The invention will be described in more detail with reference to the appended drawings, in which.

DESCRIPTION OF EMBODIMENTS

Figure 1:
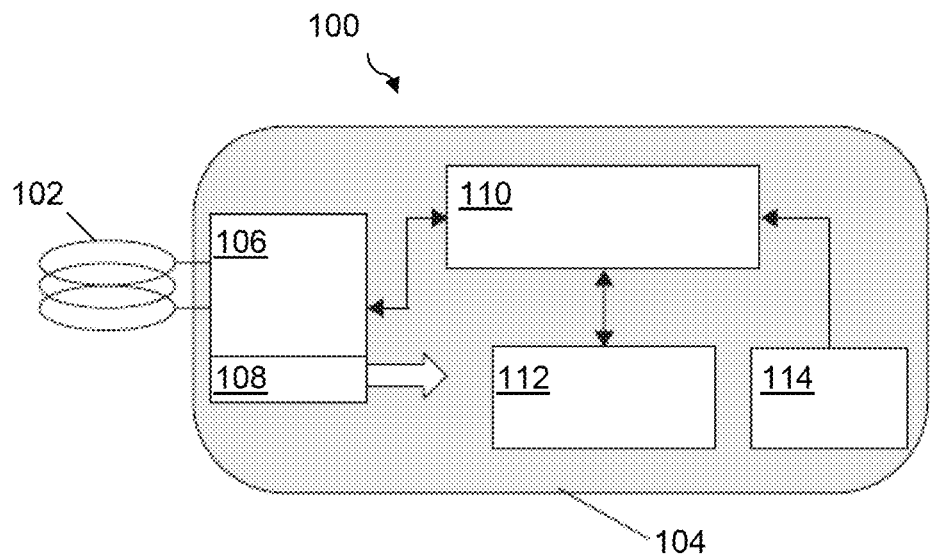
FIG. 1 shows a typical architecture of an RFID data carrier.

FIG. 1 shows a typical architecture of an RFID data carrier, as described in the RFID Handbook by Klaus Finkenzeller, Third Edition, 2010. The RFID data carrier 100 comprises an antenna 102 and a data carrier chip 104. The data carrier chip 104 comprises an RF interface 106, address and security logic 110, a non-volatile memory 112 which is either an EEPROM or an FRAM, and a read-only memory 114. The RF interface 106 comprises a part which is configured as a power supply 108 for drawing energy from the RF field and supplying the functional components of the data carrier chip 104 with power.

Figure 2:
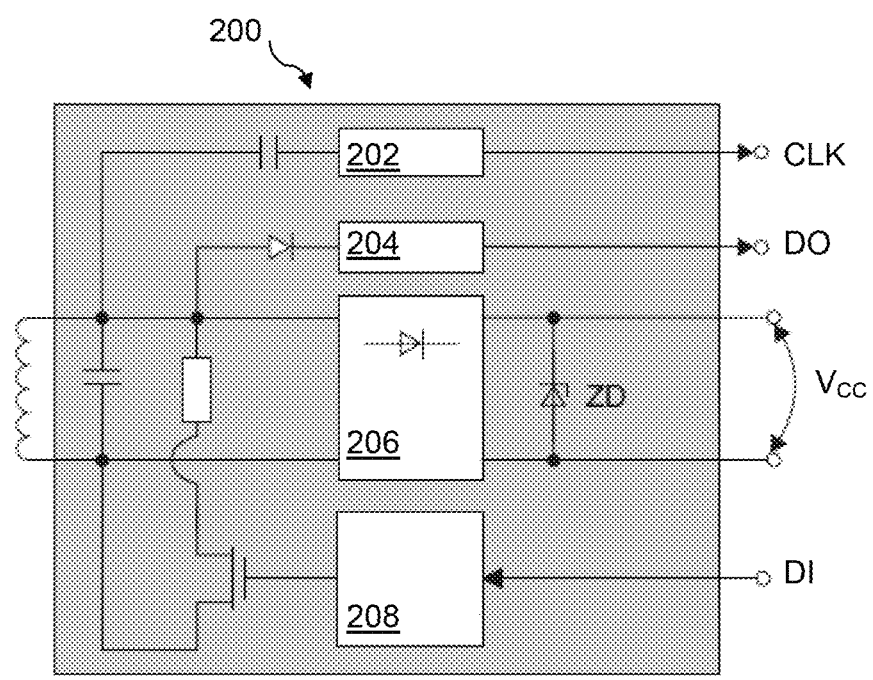
FIG. 2 shows a typical architecture of an RF interface of an inductively coupled RFID data carrier.

FIG. 2 shows a typical architecture of an RF interface of an inductively coupled RFID data carrier, as described in the above-mentioned RFID Handbook. The RF interface 200 comprises a clock 202 which is arranged to generate a system clock CLK, a demodulator 204 which is arranged to generate a data output DO, a power rectifier 206 which is arranged to deliver a supply voltage $V_{cc}$ and which is connected to a Zener diode ZD, and an ASK load modulator 208 which is arranged to load modulate a data input DI.

Figure 3:
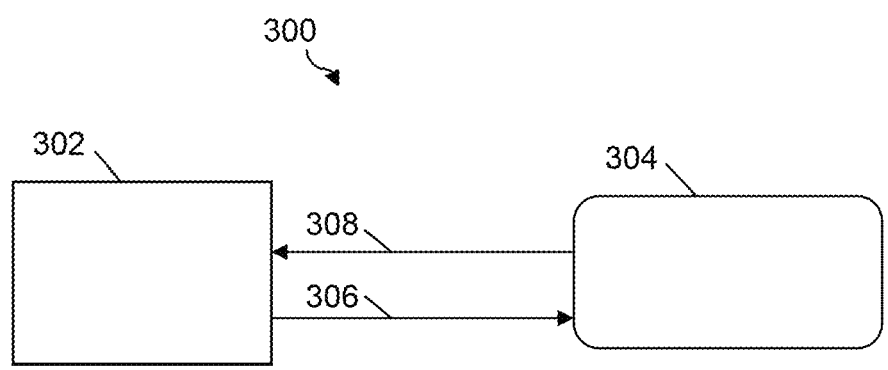
FIG. 3 shows an exemplary embodiment of a system for monitoring the state of health of an electronic data carrier in accordance with the invention.

FIG. 3 shows an exemplary embodiment of a system for monitoring the state of health (SOH) of an electronic data carrier in accordance with the invention. In general, the state of health of the electronic data carrier represents an actual level of performance of the electronic data carrier compared to a benchmark, for example an expected or targeted level of performance. As such, the state of health also provides an indication of the level of degradation of the performance of the electronic data carrier. This level of degradation can be used to estimate the remaining useful lifetime of the electronic data carrier.

The SOH monitoring system 300 comprises the electronic data carrier 304 and a reader device 302. For example, the electronic data carrier 304 may be an RFID data carrier of the kind set forth and the reader device 302 may be a corresponding RFID reader. According to this exemplary embodiment, the reader device 302 requests 306 a parameter value relating to the SOH from the electronic data carrier 304. Subsequently, the electronic data carrier 304 sends 308 the requested parameter value to the reader device 302, such that the reader device 302 can draw a conclusion as to whether the SOH of the electronic data carrier 304 has degraded.

In the following, various SOH parameters are presented. The skilled person will appreciate that other SOH parameters could also be used to advantage. Furthermore, the skilled person will appreciate that combinations of the presented SOH parameters could be used to advantage.

Figure 4:
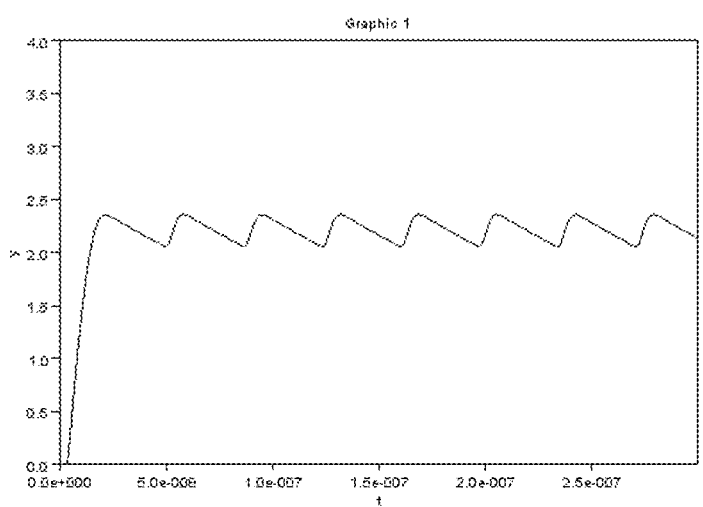
FIG. 4 shows a voltage ripple of a power rectifier.

FIG. 4 shows a voltage ripple of a power rectifier. According to a further exemplary embodiment of the invention, the SOH parameter value may be indicative of a change in the amount of power required to read data from the electronic data carrier 304. The amount of power required to read data from the electronic data carrier 304 may be derived from the performance of a power rectifier embedded in said electronic data carrier 304. For example, if the electronic data carrier is an RFID data carrier 100 (as shown in FIG. 1) the performance of the power rectifier 206 embedded in the RF interface 200 of the RFID data carrier 100 (as shown in FIG. 2) may be used for this purpose.

A relatively simple SOH monitor may determine the performance of the power rectifier by monitoring the voltage ripple of the power rectifier. It is assumed that the degradation of the electronic data carrier 304 is reflected in a change of the load characteristics (R and/or C) over time. A more advanced SOH monitor may determine the performance of the power rectifier by monitoring the rectifier efficiency, i.e. by repeatedly comparing the power received at an input of the power rectifier with the power delivered at an output of the power rectifier.

Figure 5:
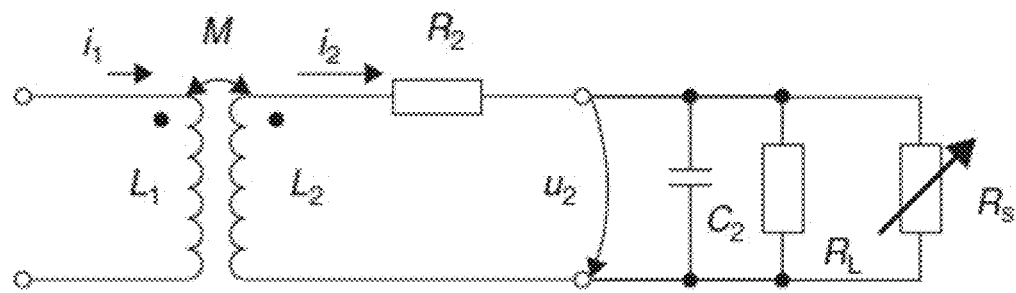
FIG. 5 shows an operating principle for voltage regulation in an RFID data carrier using a shunt regulator.

FIG. 5 shows an operating principle for voltage regulation in an RFID data carrier using a shunt regulator. In an RFID system, as shown in FIG. 3, the coupling between the reader device 302 and the electronic data carrier 304 will typically vary over time. In order to maximize the power supply level, the electronic data carrier 304 typically contains a shunt regulator. In such a system, monitoring the voltage ripple and the efficiency of the power rectifier together with the operating characteristics of the shunt regulator may provide a more precise indication of the degradation of the data carrier's power supply block.

If the electronic data carrier is an RFID data carrier (i.e. an RFID transponder) then the presence of the data carrier in the field generated by an RFID reader is noticeable through a change in impedance observed by the RFID reader. This so-called transformed transponder impedance is defined in the above-mentioned RFID Handbook, in particular in Section 4.1.10, Formula (4.50):

$$Z'_T = \frac{\omega^2 k^2 L_1 L_2}{R_2 + j\omega L_2 + \frac{R_L}{1 + j\omega R_L C_2}}$$

Furthermore, a change of the resonant frequency $f_{RES}$ of the transponder affects the transformed transponder impedance. Therefore, a structural change of the transponder's resonant frequency $f_{RES}$ is a suitable indicator of a degraded state of health of said transponder. The RFID reader can determine the precise resonant frequency $f_{RES}$ of the transponder by performing a frequency-sweep and an analysis of the response. The term "structural" refers to the fact that the determination of the resonant frequency is repeated in order to analyze the change of the resonant frequency over time.

Another suitable parameter for realizing a SOH monitor is a change of the Q-factor of the transponder's antenna. The Q-factor is defined in the above-mentioned RFID Handbook, in particular in Section 4.1.7, Formula (4.31):

$$Q = \frac{1}{R_2\sqrt{\frac{C_2}{L_2}} + \frac{1}{R_L}\sqrt{\frac{L_2}{C_2}}} = \frac{1}{\frac{R_2}{\omega L_2} + \frac{\omega L_2}{R_L}}$$

A change of the Q-factor can be caused by a change in resonant frequency, coil inductance and/or resistance (Section 11.4.3, Formula (11.8), of said RFID Handbook, wherein $f_{RES}$ represents the resonant frequency). Furthermore, the bandwidth B of the transponder resonant circuit is inversely proportional to the Q-factor (Section 4.1.10, Formula (4.55), of said RFID Handbook).

$$Q\text{-factor: } Q = \frac{2\pi f_{res} L_{coil}}{R_{total}}$$

$$\text{Bandwidth: } B = \frac{f_{res}}{Q}$$

Thus, according to this exemplary embodiment of the invention, the resonant frequency $f_{RES}$ of the transponder can also be measured by performing a frequency-sweep. If the resonant frequency $f_{RES}$ of the transponder is measured, the contribution of the LR-ratio to the Q-factor can be derived. Changes in the LR-ratio can be used as an indicator of the state of health of the transponder.

Furthermore, if the system is based on RFID communication and Amplitude Shift Keying (ASK) is used as a modulation technique, then a change of the duty factor of the ASK load modulator may provide a good indication of the state of health of the transponder. In Section 6.2.1 of said RFID Handbook the duty factor m is defined by first calculating the mean $U_m$ of the keyed and unkeyed level and subsequently the ratio between the difference and the mean:

$$\text{Mean: } U_m = \frac{U_0 + U_1}{2}$$

$$\text{Duty factor: } m = \frac{\text{abs}(U_0 - U_1)}{U_m}$$

Figure 6:
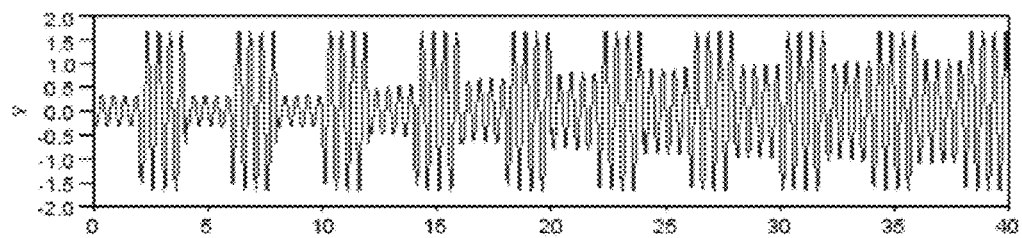
FIG. 6 shows a degradation of an RFID data carrier reflected by a change of the duty factor of an ASK load modulator embedded in said RFID data carrier.

FIG. 6 shows a degradation of an RFID data carrier reflected by a change of the duty factor of an ASK load modulator embedded in said RFID data carrier. An increased resistance results in a smaller difference between the unkeyed and keyed value while the mean value becomes larger. Similarly, a reduced modulator resistance over time will also be reflected in a change of the duty factor (not shown).

Furthermore, the parameter value may be indicative of a change of the response time of the electronic data carrier. In principle, the longer it takes for the electronic data carrier to respond, the higher the probability that the state of health of the electronic data carrier has degraded. This parameter may be combined with the above-described parameters in order to provide a more precise indication of the data carrier's state of health.

Furthermore, the parameter value may be indicative of an error rate in the communication between the reader device and the electronic data carrier. In particular, the state-of-health monitor may be arranged to observe an increase in the mean bit-error-rate (BER) per transaction or interaction.

Figure 7:
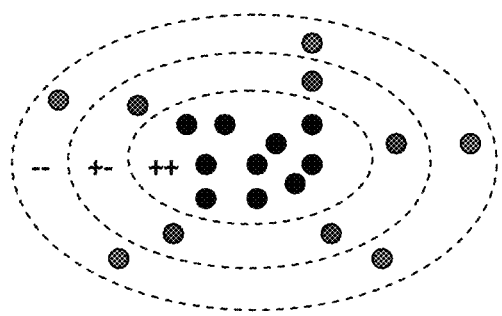
FIG. 7 illustrates a classification of RFID data carriers in order to determine the state of health of a particular RFID data carrier.

FIG. 7 illustrates a classification of RFID data carriers in order to determine the state of health of a particular RFID data carrier. Basically, the reader device may also compare the state of health of the electronic data carrier with the state of health of other electronic data carriers. Thus, the reader device uses data gathered from other electronic data carriers of the same population by looking up this data in a database, for example.

In FIG. 7, each dot represents an individual RFID data carrier (for example, a smart card). The total population consists of a number of RFID data carriers and parameter value(s) for each RFID data carrier are monitored and known at a global level. Based on a value comparison a classification can be made as shown in the FIG. 7 (dashed ellipses). Outliers—having (a) significantly different parameter value(s)—can then be classified and used to determine the state of health of a particular RFID data carrier within the total population. In FIG. 7, RFID data carriers having a relatively bad state of health fall in the category marked with the −− sign, RFID data carriers having an average state of health fall in the category marked with the +− sign, and RFID data carriers having a good state of health fall in the category marked with the ++ sign. The skilled person will appreciate that other classifications are also possible, for example classifications having more than three categories.

The present state of health of an electronic data carrier may be determined by a dedicated interaction between a reader device and an electronic data carrier. This may be regarded as a "health-shake operation" between the reader device and the electronic data carrier, in analogy to a handshake operation in a client-server system, for example.

Summarizing, it is proposed to equip electronics in electronic data carriers and/or reader devices with a state-of-health (SOH) monitor for monitoring the state of health of said electronic data carriers. The SOH monitor keeps historic data (parameter values) such that a degradation of the state of health of an electronic data carrier over time can be observed. These historic data may be stored on the electronic data carrier, at the reader side or "in the cloud".

The SOH monitor can be useful to signal a degraded health of a smart card to a user far in advance of an actual breakdown, for example. A typical use case is to issue a warning to the user or issuer of the card regarding this smart card approaching end-of-life (EOL). This allows the card owner or issuer to take preventive actions to avoid card failure, for example by scheduling timely replacement of the card. This avoids cases in which the user is left stranded, for instance, while travelling, without a readable passport, or an identification document or unable to perform a payment.

Besides user convenience, a SOH monitor of the kind set forth can be useful for two other purposes. The first is to perform (more) effective health management, e.g. by performing operations more conservatively and possibly impacting the Quality-Of-Service (QOS) but at the same time extending card lifetime. Another purpose of the SOH monitor could be to perform a security preserving action just prior to breakdown of the data carrier, for example by erasing its (flash) memory or activating a permanent reset condition to make it inoperable.

Figure 8:
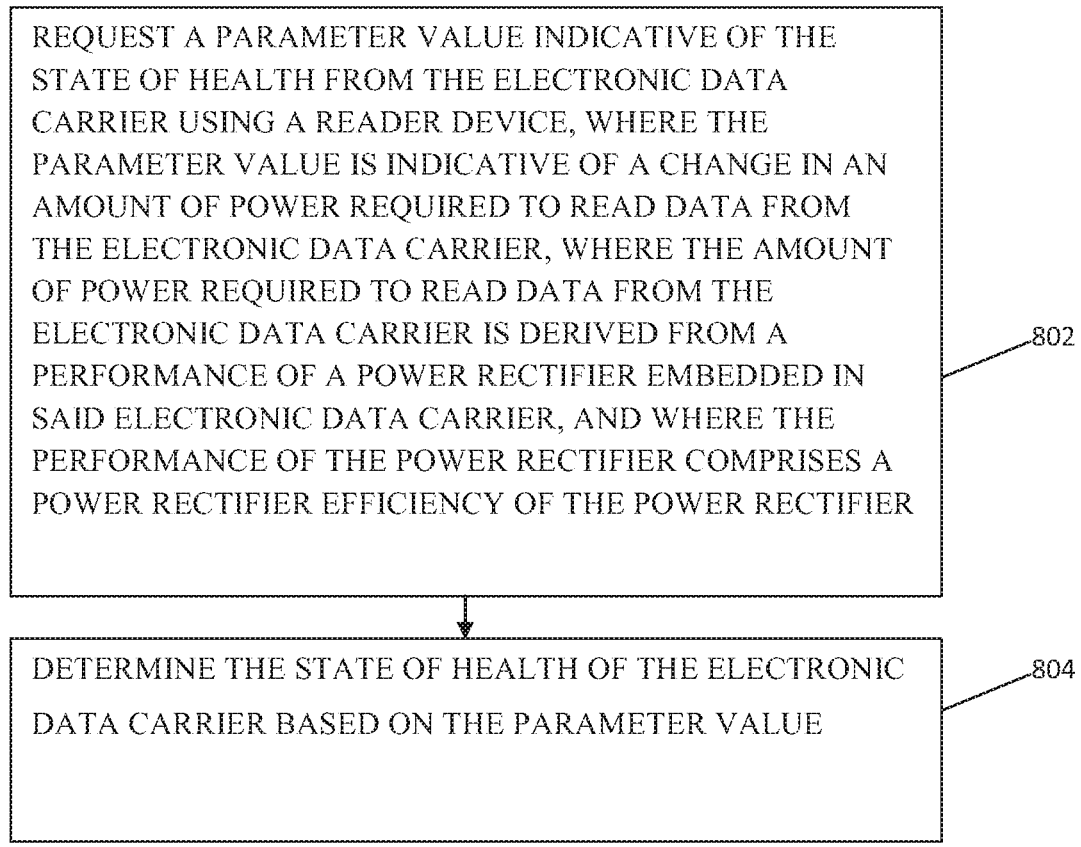
FIG. 8 is a process flow diagram of a method for monitoring a state of health of an electronic data carrier in accordance with an embodiment of the invention.

FIG. 8 is a process flow diagram of a method for monitoring a state of health of an electronic data carrier in accordance with an embodiment of the invention. At block 802, a parameter value indicative of the state of health from the electronic data carrier is requested using a reader device, where the parameter value is indicative of a change in the amount of power required to read data from the electronic data carrier, where the amount of power required to read data from the electronic data carrier is derived from the performance of a power rectifier embedded in said electronic data carrier, and where the performance of the power rectifier includes a power rectifier efficiency of the power rectifier. At block 804, the state of health of the electronic data carrier is determined based on the parameter value.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

LIST OF REFERENCE SIGNS

100 RFID data carrier
102 antenna
104 data carrier chip
106 RF interface
108 power supply
110 address and security logic
112 EEPROM or FRAM
114 ROM
200 RF interface
202 clock
204 demodulator
206 power rectifier
208 ASK load modulator
CLK system clock
DO data output
$V_{cc}$ supply voltage
DI data input
ZD Zener diode
300 SOH monitoring system
302 reader device
304 electronic data carrier
306 request SOH parameter value
308 send SOH parameter value

The invention claimed is:

1. A method for monitoring an electronic data carrier, the method comprising:
requesting a parameter value indicative of a state of health from the electronic data carrier using a reader device, wherein the requested parameter value is indicative of a change in an amount of power required to read data from the electronic data carrier, wherein the amount of power required to read data from the electronic data carrier is derived from a performance of a power rectifier embedded in said electronic data carrier;
determining the state of health of the electronic data carrier based on the requested parameter value;
estimating a remaining lifetime of the electronic data carrier based on the state of health; and
based on the estimated remaining lifetime of the electronic data carrier, performing a security preserving action prior to a breakdown of the electronic data carrier by erasing a memory of the electronic data carrier or activating a permanent reset condition to make the electronic data carrier inoperable.

2. The method as claimed in claim 1, wherein the performance of said power rectifier is determined by monitoring a voltage ripple of the power rectifier.

3. The method as claimed in claim 1, wherein the performance of said power rectifier is determined by repeatedly comparing the power received at an input of the power rectifier with the power delivered at an output of the power rectifier.

4. The method as claimed in claim 1, wherein the performance of said power rectifier is determined by monitoring an operation of a shunt regulator embedded in the electronic data carrier.

5. The method as claimed in claim 1, wherein the reader device compares said requested parameter value with further parameter values, said further parameter values being indicative of the state of health of further electronic data carriers.

6. The method as claimed in claim 1, wherein the present state of health of the electronic data carrier is determined by a dedicated interaction between the reader device and the electronic data carrier.

7. The method of claim 1, further comprising issuing a warning to a user or an issuer of the electronic data carrier regarding the electronic data carrier approaching end-of-life (EOL).

8. A system for monitoring an electronic data carrier, the system comprising: a reader device operable to request a parameter value indicative of a state of health from said electronic data carrier, wherein said reader device is arranged to determine the state of health of the electronic data carrier based on the requested parameter value indicative of said state of health from the electronic data carrier such that the requested parameter value is indicative of a change in an amount of power required to read data from the electronic data carrier, wherein the amount of power required to read data from the electronic data carrier is derived from a performance of a power rectifier embedded in said electronic data carrier, and wherein the reader device is configured to estimate a remaining lifetime of the electronic data carrier based on the state of health and to, based on the estimated remaining lifetime of the electronic data carrier, perform a security preserving action prior to a breakdown of the electronic data carrier by erasing a memory of the electronic data carrier or activating a permanent reset condition to make the electronic data carrier inoperable.

9. The system as claimed in claim 8, wherein the electronic data carrier is embedded in one of the group consisting of: a contact-bound smart card, a contactless smart card, an electronic passport, an RFID tag.

10. The method of claim 1, further comprising based on the estimated remaining lifetime of the electronic data carrier, performing an operation to impact Quality-Of-Service (QOS) to extend the lifetime of the electronic data carrier.

* * * * *